June 17, 1969

D. H. KRAFT ET AL 3,450,038

HIGH SPEED PRESS

Filed April 4, 1967

INVENTORS
DERALD H. KRAFT
ROBERT A. HELRIGEL
ROBERT G. SUNTHEIMER
BY
*Meyer, Tilberry & Body*
ATTORNEYS INVENTORS
DERALD H. KRAFT
ROBERT A. HELRIGEL
ROBERT G. SUNTHEIMER
BY
Meyer, Tilberry & Body
ATTORNEYS.

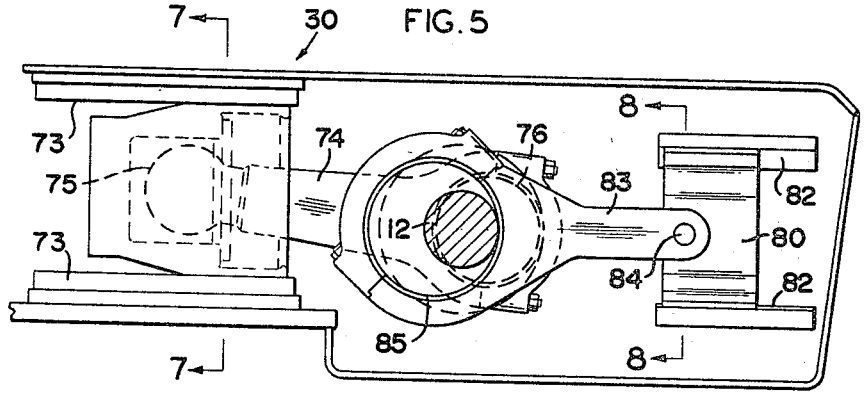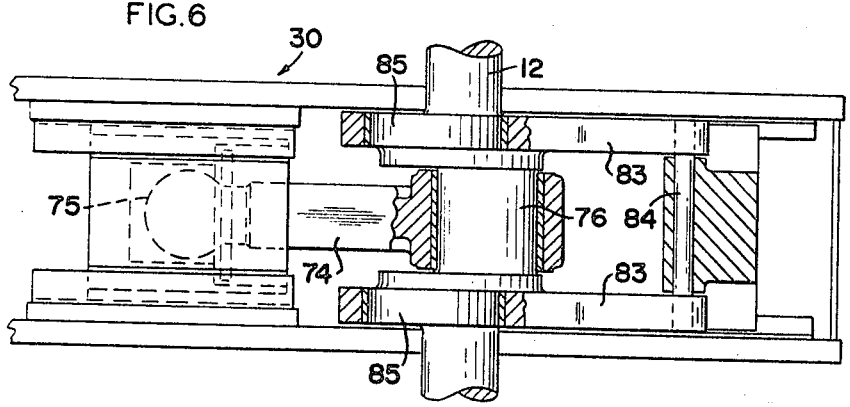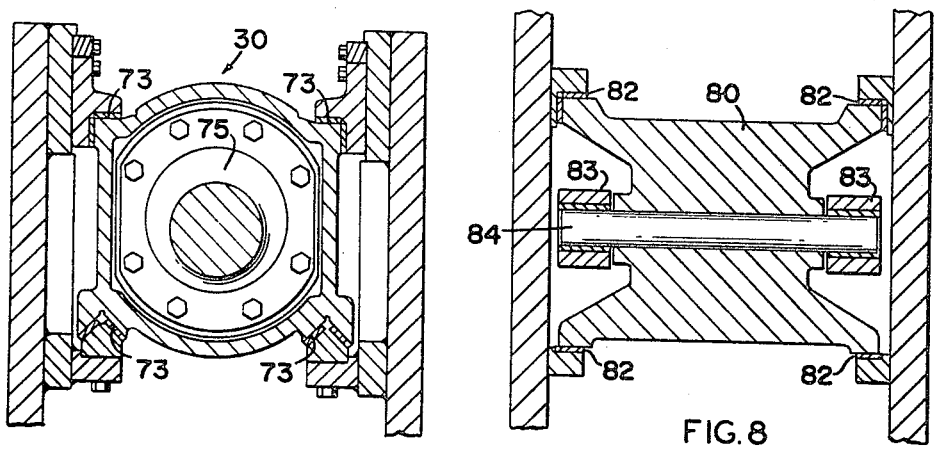

United States Patent Office 3,450,038
Patented June 17, 1969

3,450,038
HIGH SPEED PRESS
Derald Henry Kraft, Canton, Ohio, and Robert Arthur Helrigel and Robert Gordon Suntheimer, Hastings, Mich., assignors to E. W. Bliss Company, Canton, Ohio, a corporation of Delaware
Filed Apr. 4, 1967, Ser. No. 628,454
Int. Cl. B30b 5/00; B41f 3/20; B62d 5/08
U.S. Cl. 100—257    6 Claims

ABSTRACT OF THE DISCLOSURE

The disclosure relates to a crank driven press from which a high working speed is obtained owing to a substantial reduction in vibrational forces. The combination includes a slide reciprocated relative to a bed in which all adjustments-axially and transversely-relative to the press center line are made in the bed thus eliminating the need for adjusting mechanisms associated with the slide and in consequence of which V-type gibbing precisely align the slide with the press center line and bed and a reciprocatory mass is provided having the same stroke and reciprocatory force as the slide; both being driven by the crankshaft of the press in timed relationship such that the force of the slide is balanced by the equal but opposite force of the reciprocatory mass.

DISCLOSURE

The invention will be described herein with particular reference to a horizontal press having a slide and a bed on which dies may be secured for drawing, punching, bending, forming and otherwise working material placed between the dies, however, it will be appreciated that it has much broader applications and is equally applicable to crank driven presses generally whether the slide reciprocates horizontally or vertically relative to a bed.

Heretofore, the die shut height adjustment—the free space between bed and slide able to receive dies—has commonly been made in the press crown by adjusting the slide vertically relative to the bed which is fixed. For example in knuckle joint presses, the slide is adjusted by means of an adjusting wedge which is movable in and out between a slide adjusting block and the underside of the press crown. The arrangement includes spring suspensions which support the adjusting block from the crown and hold it yieldably against the wedge. A tapered surface on the crown coacts with the wedge so as to adjust the block and slide vertically when the wedge is moved in or out. The force of the spring suspensions is then readjusted if needed to maintain the proper tension on the adjusting block.

Experience has shown that the vibration and shaking forces encountered from slide reciprocation, even at low speed operation, make it difficult to adjust the slide accurately and, heretofore, it has been necessary to install such presses, and particularly horizontal presses, on large steel bases imbedded in concrete or to otherwise run such presses at such a slow speed as to be impractical.

These and other difficulties are obviated with the present invention in which all necessary adjustments are made in the bed—both axially and transversely—thereby permitting the elimination of vibration and shaking forces insofar as possible by counter-balancing the reciprocatory force of the slide with the result that much higher speeds are obtained.

In accordance with the invention, a high speed crank driven press includes an adjustable bed in combination with a counterbalanced slide. A guideway mounts the slide for movement to and fro in a reciprocatory path relative to the bed along the press center line. A connecting rod is journaled at one end to the slide and at the other end to the press crankshaft for imparting reciprocatory movement to the slide. And a mass of predetermined weight is driven by the crankshaft and mounted for reciprocatory movement in timed relationship with the slide so that its reciprocatory force is equal but opposite to that of the slide permitting a substantial reduction in the vibratory forces transmitted to the bed.

Further in accordance with the invention, the adjustable bed comprises a bolster plate mounted on longitudinally extending guideways parallel to the reciprocatory path of the slide having an inclined surface on one side. And a wedge is movable against the inclined surface transversely to the direction of slide reciprocation to shift the bolster plate longitudinally relative to the slide.

Further in accordance with the invention, a bi-directional bolster adjusting plate is mounted on the bolster plate on the side opposite the inclined surface whereby the bolster plate is capable of adjustment in three directions.

A principal object of the invention is the reduction of vibration and shaking forces in a crank driven press thereby permitting operation at higher speeds.

A further object is the provision of a bed and slide combination particularly suited for horizontal press applications in which the die shut height adjustments are made entirely from the bed.

Another object is the provision of a bed adjustable in at least three directions—one parallel and two transverse—relative to the slide reciprocatory path.

Still another object is to provide precision machined slide guideways having a greater bearing area thereby permitting removal of excessive tolerances in the slide.

Another object is to provide a slide which has its reciprocatory force fully counterbalanced.

These and other objects will be more apparent by referring to the following description and drawings wherein:

FIGURE 5 is a longitudinal view of the slide and reciprocatory mass taken approximately along line 5—5 of FIGURE 1;

FIGURE 6 is a horizontal sectional view of the slide and reciprocatory mass partially broken away showing the eccentric arrangement on the press crankshaft;

FIGURE 7 is a cross sectional view of the slide taken along line 7—7 of FIGURE 5; and FIGURE 8 is a cross sectional view of a reciprocatory mass taken along line 8—8 of FIGURE 5.

Figure 1:
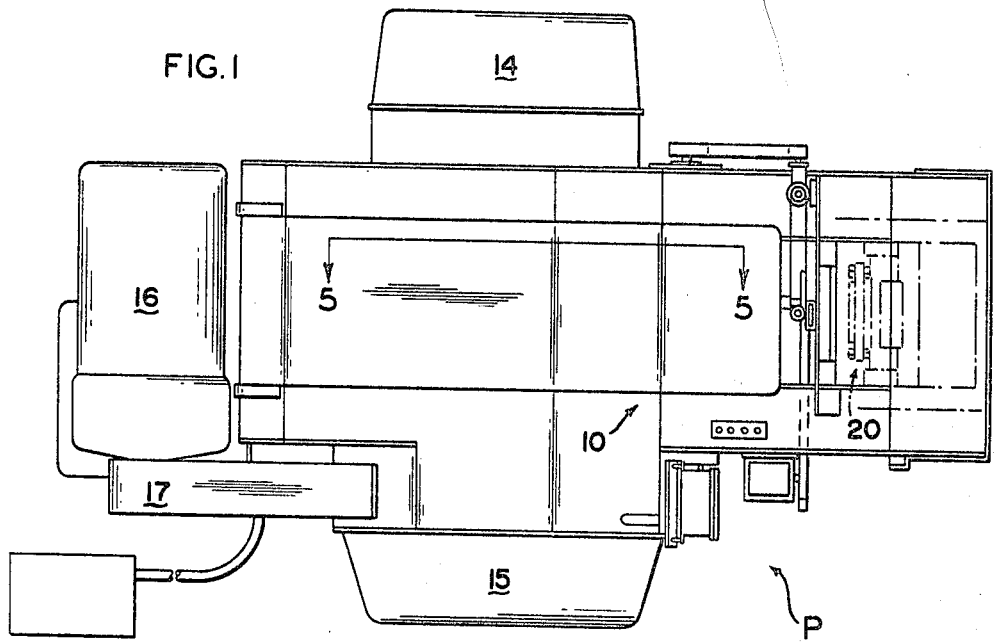
FIGURE 1 is a plan view of a horizontal press incorporating the inventive combination.
Figure 2:
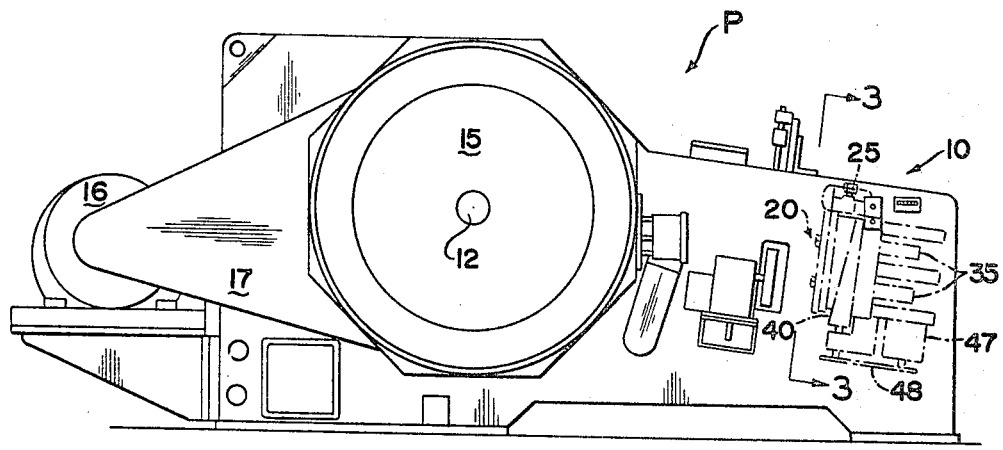
FIGURE 2 is a front view of the press shown in FIGURE 1.

Referring now to the drawings wherein the showing are merely for the purpose of illustrating a preferred embodiment of the invention and not for the purpose of limiting same in FIGURES 1 and 2 are shown the general layout plan and front elevational views of a horizontal press P incorporating a slide and bed combination generally indicated by the numeral 10 in accordance with the preferred embodiment of the invention. The press P as a whole forms no part of the present invention but in general includes the arrangement of a crankshaft 12 mounted for rotation in a horizontal plane having a brake 14 on one end and a flywheel and clutch 15 on the opposite end. A motor 16 and drive 17 may be engaged by means of the clutch 15 to rotate the crankshaft 12.

Figure 3:
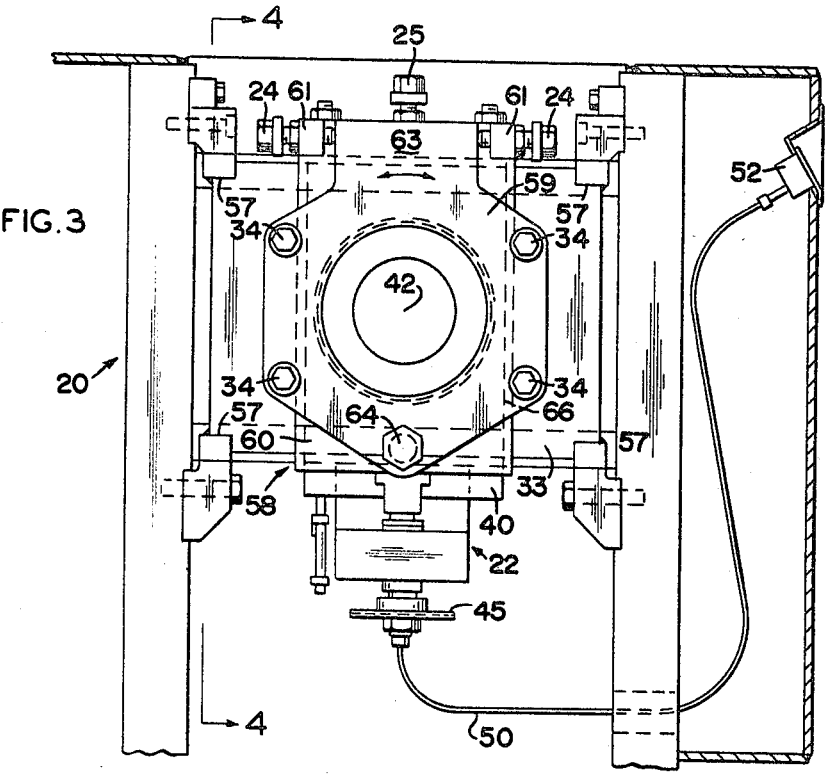
FIGURE 3 is an end view of the bed taken along line 3—3 of FIGURE 2.
Figure 4:
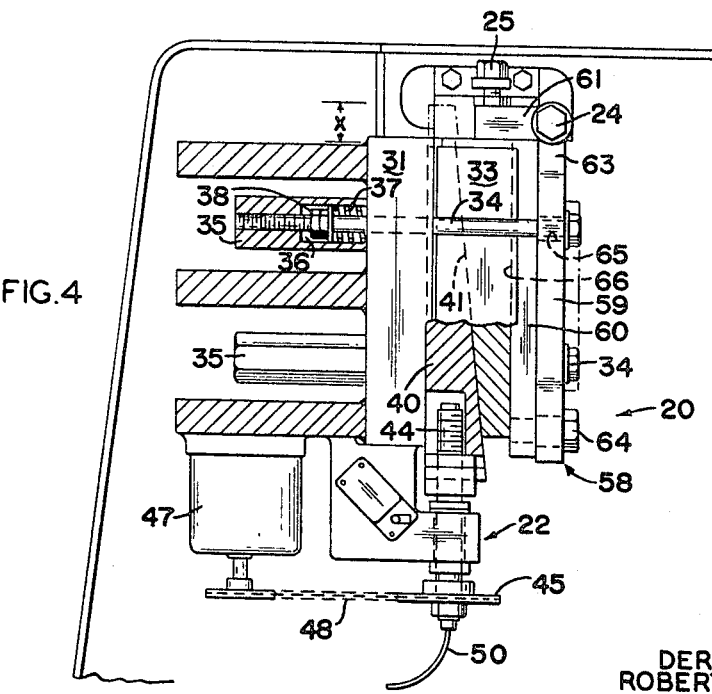
FIGURE 4 is a broken vertical sectional view through the bed taken approximately along line 4—4 of FIGURE 3.

In accordance with the invention the press P is capable of a very high continuous working speed in which the bed and slide combination 10 achieve the high speed primarily through a reduction in the vibration and shaking forces heretofore encountered in such presses. Referring generally now to FIGURE 3 and 4, the bed 20 includes a wedge adjusting mechanism 22 capable of varying the die shut height or longitudinal distance between the bed and slide and in addition, a bi-directional transverse and vertical adjustment is provided by two side adjusting screws 24 and one vertical adjusting screw 25. A slide 30 (FIGS. 5–8) is reciprocated horizontally relative to the bed 20.

THE BED

In more detail, the bed 20 includes a bolster support block 31 to which is yieldably connected a bolster plate 33 by means of four spring suspension bolts 34 each of which includes a bolster locking nut 35 having a recessed portion 36 adapted to receive a coiled spring 37 held in compression against the back of the support block 31 by means of nuts 38. Intermediate the support block 31 and bolster plate 33 is the wedge adjustment mechanism 22 which includes an adjusting wedge 40 movable transversely to the press center line 42 against an inclined surface 41 on the underside of the bolster plate 33. An adjusting screw 44 in the movable wedge 40 is driven by a sprocket 45 connected to a reversible motor 47 by means of a chain 48. A bi-directional flexible cable 50 is connected at one end to the adjusting screw 44 and at the other end to a counter 52 registering the change in die shut height brought about by transverse movement of the wedge 40. Rotation of the adjusting screw 44 in one direction moves the wedge 40 inwardly against the force of spring suspension bolts 34 a maximum distance $x$ as represented by the dot-dash line position (FIG. 4) thus decreasing the die shut height. Rotation of the adjusting screw 44 in the opposite direction has the opposite result. If necessary the spring suspension bolts 34 may be adjusted afterwards to maintain the proper tension on the bolster plate 33. The bolster plate 33 is guided at the corners by V-type gibbing 57 (FIG. 3) on precision machined surfaces establishing parallel longitudinal guideways properly centered with the press center line 42.

In addition to the longitudinal movement, the bolster plate 33 carries a bolster adjusting plate 58 which is capable of bi-directional adjustment in planes extending transversely to the longitudinal axis of movement. The bolster adjusting plate 58 includes side-by-side front and rear sections 59, 60. The two side adjusting screws 24 referred to previously are mounted at the upper corners of section 60 in ears 61 which project outwardly alongside a tail portion 63 at the top of section 59. The screws 24 are mutually adjusted to pivot the section 59 in a direction either side of the press center line 42 about a pivot 64 near the bottom as indicated by the directional arrows (FIG. 3). Oversized holes 65 in the section 59 accommodate the spring suspension bolts 34 and permit the required pivotal adjustment.

The rear section 60 is vertically movable in a slot 66 cut in the upper side of the bolster plate 33 between the suspension bolts 34. The vertical adjusting screw 25 is mounted at the upper end of section 60 and bears against the top of the bolster plate 33 to raise or lower both sections 59, 60 in the slot 66 relative to the press center line. For making either the transverse or vertical adjustment of the bolster adjusting plate 58, it is normally necessary to loosen the suspension bolts 34.

THE SLIDE

Referring now to FIGURES 5–8, the slide 30 is guided in V-type gibbing 73 in precision alignment with the press center line 42. A connecting rod 74 has a ball and socket connection 75 in the slide at one end and is journaled at the other end on a crank throw 76 of the crankshaft 12, rotation of which effects reciprocatory movement of the slide 30 relative to the bed 22. Inasmuch as all of the adjustments formerly made in the slide are, in accordance with the invention, now made in the bed 22, the V-gibbing 73 for the slide is free of any excessive tolerances and provides a greater support area for the reciprocatory motion of the slide which gives extreme accuracy of alignment. These are contributory factors in the reduction of vibration and shaking forces of the press and in achieving the consequent higher speeds of the invention.

Moreover, with the slide free of any adjusting mechanisms, its reciprocatory force may be counterbalanced providing a further reduction in the vibration forces and permitting consequent higher speeds. For this purpose a reciprocatory weight 80 is guided in V-type gibbing 82 along a reciprocatory stroke equivalent to that of the slide. Two connecting rods 83 are each connected at one end to the weight 80 by means of a wrist pin 84 and journaled at the opposite end to the crankshaft 12 on a pair of eccentrics 85 on opposite sides of the crank throw 76. In the preferred embodiment of the invention, the reciprocatory mass of the weight 80 and connecting rods 83 is the same as that of the slide 30 and its connecting rod 74. Also, the eccentricity of the crank throw 76 and the eccentrics 85 is the same so that the strokes are equal but displaced 180° out of phase so that the reciprocatory forces are equal but opposite.

Having thus described our invention, we claim:

1. A high speed crank driven press comprising, in combination, a bed, a slide, slide guideway means in which the slide is reciprocated relative to the bed, a crankshaft, a connecting rod journaled at one end to the slide and at the other end to the crankshaft for imparting reciprocatory movement to the slide, a reciprocatory mass, other guideway means for guiding the mass in a reciprocatory path, eccentric crank throw means on the crankshaft angularly displaced relative to the slide crankshaft journal, a connecting rod journaled on the eccentric crank throw means for reciprocating the mass in timed relationship with the reciprocatory movement of the slide so that the reciprocatory forces of the slide and mass are counterbalanced, bed adjustment means for moving the bed axially along the press center line, said bed adjustment means including a bolster plate mounted for axial movement, an inclined surface on the underside of said bolster plate, a support block, wedge means movable transversely to the press center line between said support block and bolster plate and cooperating with said inclined surface for moving the bolster plate axially, and spring suspension means yieldably holding the bolster plate against said wedge means.

2. The combination according to claim 1 wherein a bolster adjust plate is mounted on said bolster plate and comprises an adjusting plate movable in a first direction transverse to the press center line and a plate section movable in a second direction intersecting said first direction whereby the bed has three directions of adjustment—one axially and two transversely.

3. The combination according to claim 2 wherein the plate section is pivoted adjacent one side of the adjusting plate to swing in an arc intersecting said first direction.

4. The combination according to claim 3 wherein the slide and reciprocatory mass are each guided in V-type gibbing parallel to the press center line.

5. In a press having an axial center line and a bed, bolster plate means mounted for axial movement on said bed, said bolster plate means having an underside, an inclined surface on said underside, a support block, wedge means movable transversely to the press axial center line between said support block and bolster plate means, said wedge means cooperating with said inclined surface for moving said bolster plate axially, and spring suspension means yieldably holding said bolster plate means against said wedge means.

6. The device of claim 5 and further including lateral adjustment means for movably adjusting said bolster plate means laterally of said axial center line.

References Cited

UNITED STATES PATENTS

| | | |
|---|---|---|
| 983,218 | 1/1911 | Dreisvogt _____ 83—527 |
| 1,716,414 | 6/1929 | Beyer. |
| 2,321,325 | 6/1943 | Sherman et al. _____ 83—615 |
| 2,730,760 | 1/1956 | Bibby. |

FOREIGN PATENTS

| | | |
|---|---|---|
| 151,348 | 5/1953 | Australia. |
| 274,101 | 5/1914 | Germany. |
| 516,074 | 12/1939 | Great Britain. |

BILLY J. WILHITE, *Primary Examiner.*

U.S. Cl. X.R.

72—446; 83—527, 615; 100—282